United States Patent [19]
Stark et al.

[11] Patent Number: 5,343,992
[45] Date of Patent: Sep. 6, 1994

[54] SWITCHABLE FREEWHEEL WITH LOCKING ELEMENTS

[75] Inventors: Johann Stark, Höchstadt; Joachim Ritter, Herzogenaurach, both of Fed. Rep. of Germany

[73] Assignee: Ina Walalager Schaeffler KG, Fed. Rep. of Germany

[21] Appl. No.: 976,972
[22] PCT Filed: Jul. 27, 1991
[86] PCT No.: PCT/EP91/01411
§ 371 Date: Jan. 19, 1993
§ 102(e) Date: Jan. 19, 1993
[87] PCT Pub. No.: WO92/02742
PCT Pub. Date: Feb. 20, 1992

[30] Foreign Application Priority Data
Feb. 8, 1990 [DE] Fed. Rep. of Germany ....... 4024616

[51] Int. Cl.5 ...................... F16D 15/00; F16D 41/08
[52] U.S. Cl. ................................. 192/45.1; 192/41 A; 192/43; 192/47; 192/93 C; 188/82.2
[58] Field of Search ....................... 192/45.1, 43, 41 A, 192/47, 93 C, 93 A; 188/82.2

[56] References Cited
U.S. PATENT DOCUMENTS

| | | | |
|---|---|---|---|
| 2,001,668 | 5/1935 | Maier | 192/47 X |
| 2,113,512 | 4/1938 | Kesterton | 192/47 |
| 2,991,861 | 7/1961 | Von Thuengen | 192/45 |
| 3,008,559 | 11/1961 | Forster | 192/45 |
| 3,017,964 | 1/1962 | Von Theungen | 188/82.84 |
| 3,976,175 | 8/1976 | Herbert | 192/44 |
| 4,635,771 | 1/1987 | Shoji et al. | 192/41 A |
| 4,875,564 | 10/1989 | Leitz et al. | 192/41 A X |

FOREIGN PATENT DOCUMENTS 3307824 9/1984 Fed. Rep. of Germany.
667440 10/1929 France.

OTHER PUBLICATIONS
Copy of vol. 117 (M–381) (1849) May 22, 1985.
Copy of Japanese Article No. 60–4630, Jan. 1985.
Copy of Search Report.

*Primary Examiner*—Andrea L. Pitts
*Attorney, Agent, or Firm*—Bierman and Muserlian

[57] ABSTRACT

The invention concerns a switchable locking element freewheel with two concentric cage rings and locking elements lodged in pockets thereof, the cage rings being movable relative to each other for switching the freewheel. In order to make such a freewheel basically operable in two opposing directions and to provide simple switchover facilities herefor and also for cases in which switchability is required only in one direction, the relative movement of the two cage rings serving to switch the freewheel is an axial displacement which, with a view to any further embodiments of the freewheel, can be converted into a rotary movement.

12 Claims, 8 Drawing Sheets

SWITCHABLE FREEWHEEL WITH LOCKING ELEMENTS

The invention concerns a switchable freewheel with locking elements according to the generic part of claim 1.

A freewheel with locking elements which is operable in both directions is indeed known from EP-A-0 182 994 but in this case, two freewheels disposed adjacent to each other and acting in opposite directions are used. Switching-free is effected radially by a frictional locking of the two freewheels and by elastic deformation of the running face diameter. This type of switching-free or switching-over mechanism is of a very complex nature and not easy to control.

The object of the invention is therefore to configure the freewheel of the initially cited type so that operation in both directions can be achieved by simple switchover facilities with the simplest possible construction and the smallest possible overall dimensions.

The invention achieves this object by the fact that the relative movement of the two cage rings serving to switch the freewheel is an axial displacement. For axially displacing the two cage rings, at least one of these rings can comprise a facility which can be made to cooperate with a surface which is inclined relative to the freewheel axis, which fact can be put to use if need be to convert the axial movement of the cage rings into a relative rotation thereof.

In an advantageous manner, it is also possible to make one of the cage rings of individual segments, each of these individual segments being disposed between circumferentially adjacent locking elements.

In particular, it is possible to arrange the inclined surface on one of the two cage rings and to arrange the faciltiy, likewise designed as a surface inclined with respect to the freewheel axis, on the other cage ring. This offers the possibility of a particularly simple embodiment in which the two inclined surfaces of the two cage rings from a sliding assembly comprising a groove on one cage ring and a spring on the other cage ring.

A particularly favourable embodiment can be obtained by making the inclined surfaces of the previous embodiment in the form of mutually contacting, spatially curved or helical surfaces in a form-fitting or frictional locking relationship to each other. The advantage of this design is the enlargement of the supporting portion of the surfaces.

Alternatively, it is possible that the facility be constituted by the radial edge of an axial cutout made in one of the page rings and facing a locking element pocket, or by a spatially curved surface of the axial cutout while the inclined surface is a surface of a tapered projection which is tapered in the axial direction and arranged on the end of a locking element facing the axial cutout. In this case, it is particularly advantageous to provide a second axial cutout facing a locking element pocket and comprising a facility in the form of a radial edge, and a second axially tapered projection on the end of a locking element facing the second axial cutout. In such a configuration, the first axial cutout and its associated facility serve for switching in one direction while the second axial cutout and its associated facility serve for switching in the other direction.

Based on this embodiment, two further alternative developments are possible, viz., firstly, that both axial cutouts are arranged on one and the same ring but on different sides with respect to the locking elements, and the two tapered projections are disposed on different axial ends of the locking elements, the second possibility being to arrange the two axial cutouts circumferentially offset with respect to each other on different cage rings, and to arrange the two tapered projections on the same axial ends of the locking elements. Both alternatives have the advantage of very small overall dimensions while being of an extremely simple construction.

Finally it is possible to provide a spring between the two cage rings which acts on these in the axial direction and by which the freewheel can be switched from one of its two switched positions into the freewheeling position, or from one switched position or the freewheeling position into the other switched position provided the cage rings are not subjected to an axial action from the outside.

The invention will now be described more closely with reference to the drawings and exclusively by way of example. The drawings show.

In all the embodiments represented in the drawings, the locking element freewheel comprises two cage rings 1 and 2 provided with pockets or lodgings 3, 4 for locking elements 5 and 6. The surfaces of associated locking rings facing the locking surfaces of the locking elements 5, 6 are not represented; these locking rings can be in the form of bushes and be integrated in the freewheel or in the units between which the freewheel is inserted.

Figure 1:
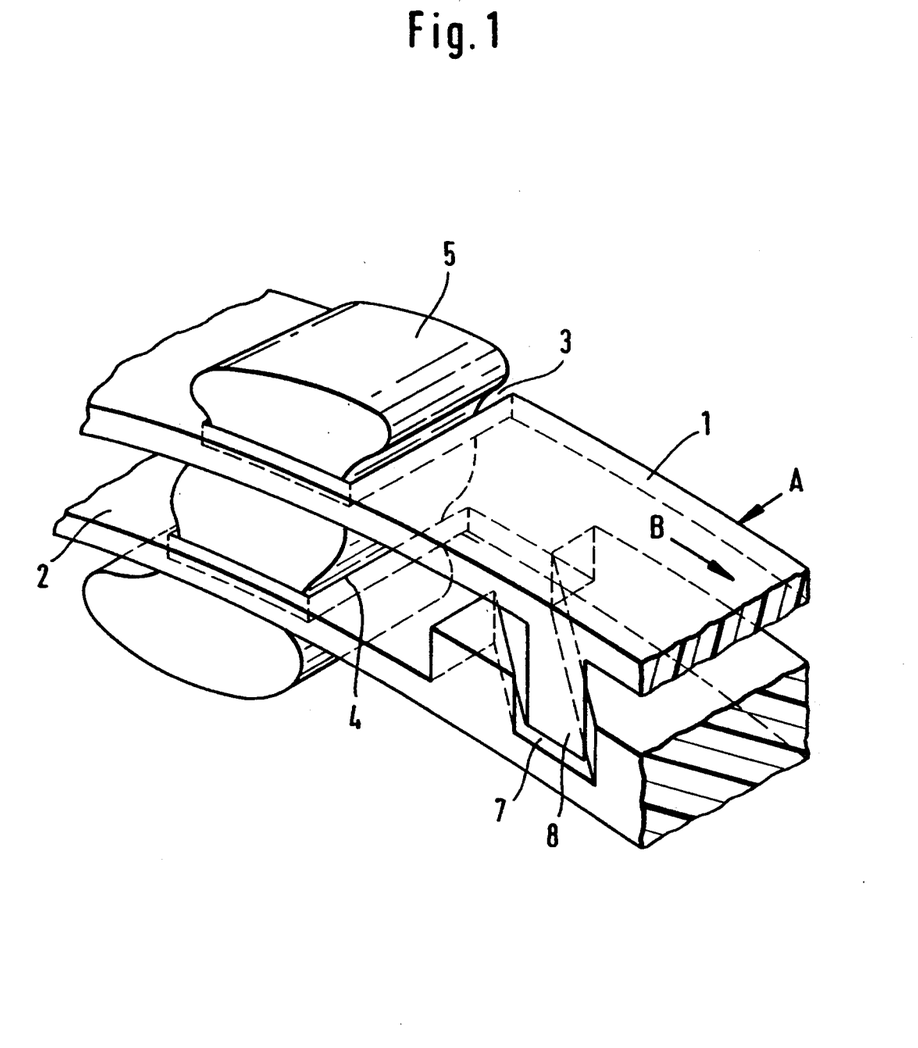
FIG. 1, a perspective view of a partial region of two cage rings with a sliding assembly and a locking element, FIG. 2, a basically similar embodiment but with an axially acting spring between the two cage rings, FIG. 3, a perspective view of a partial region of two cage rings and two locking elements of the embodiment comprising two axial cutouts in one and the same ring but on different sides with respect to the locking elements, and associated with the cutouts, tapered projections from the locking elements, FIG. 4, a perspective view of a partial section with three cage rings and one locking element comprising two conical projections on the same end face, FIG. 5, an embodiment similar to that of FIG. 2 but with locking action only in one direction, FIG. 6, a detail of an embodiment similar to that of FIG. 2 but with a spring acting directly on two adjacent locking elements, FIG. 7, a partial axial section of an embodiment comprising an outer bush and an inner sliding bearing, FIG. 8, a partial axial section of an embodiment comprising an outer bush and an inner rolling bearing, and FIG. 9, a perspective view of a partial region of two cage rings, one of which is made up of individual segments.

In the embodiment of FIG. 1, for converting the axial movement for example of the cage ring 1 relative to the cage ring 2 into a relative rotation of the two rings and to thereby obtain a pivoting of the locking elements 5 in order to switch the freewheel, a sliding assembly is provided which is constituted by a groove 7 on the outer edge of the cage ring 2 and by an associated spring 8 on the inside of the cage ring 1. The groove 7 and the spring 8 are inclined with respect to the longitudinal axis of the freewheel so that an axial displacement of the cage ring 1 in the direction of the arrow A causes this cage ring 1 to rotate at the same time in the direction of the arrow B relative to the cage ring 2.

Figure 2:
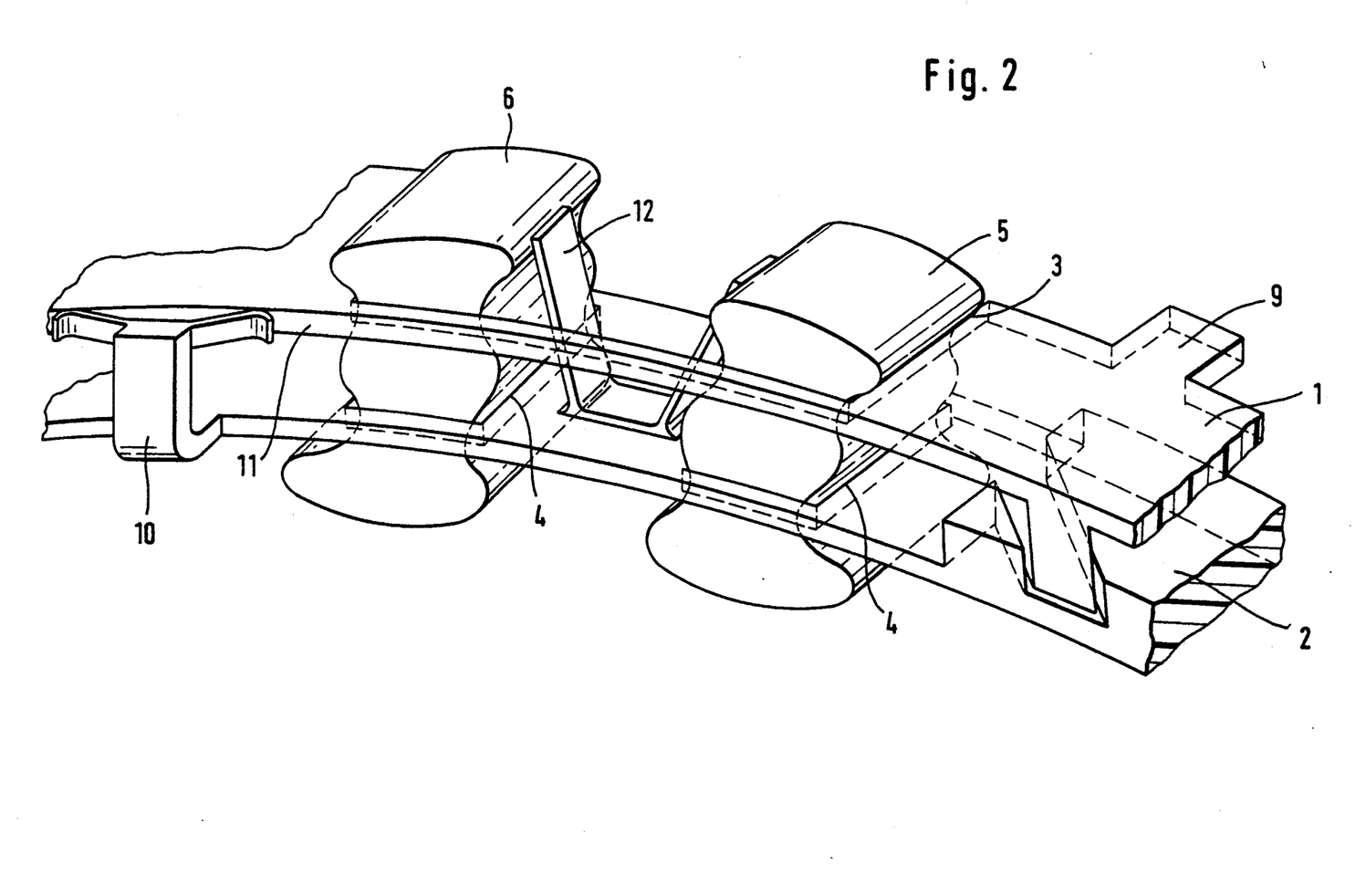
Figure 5:
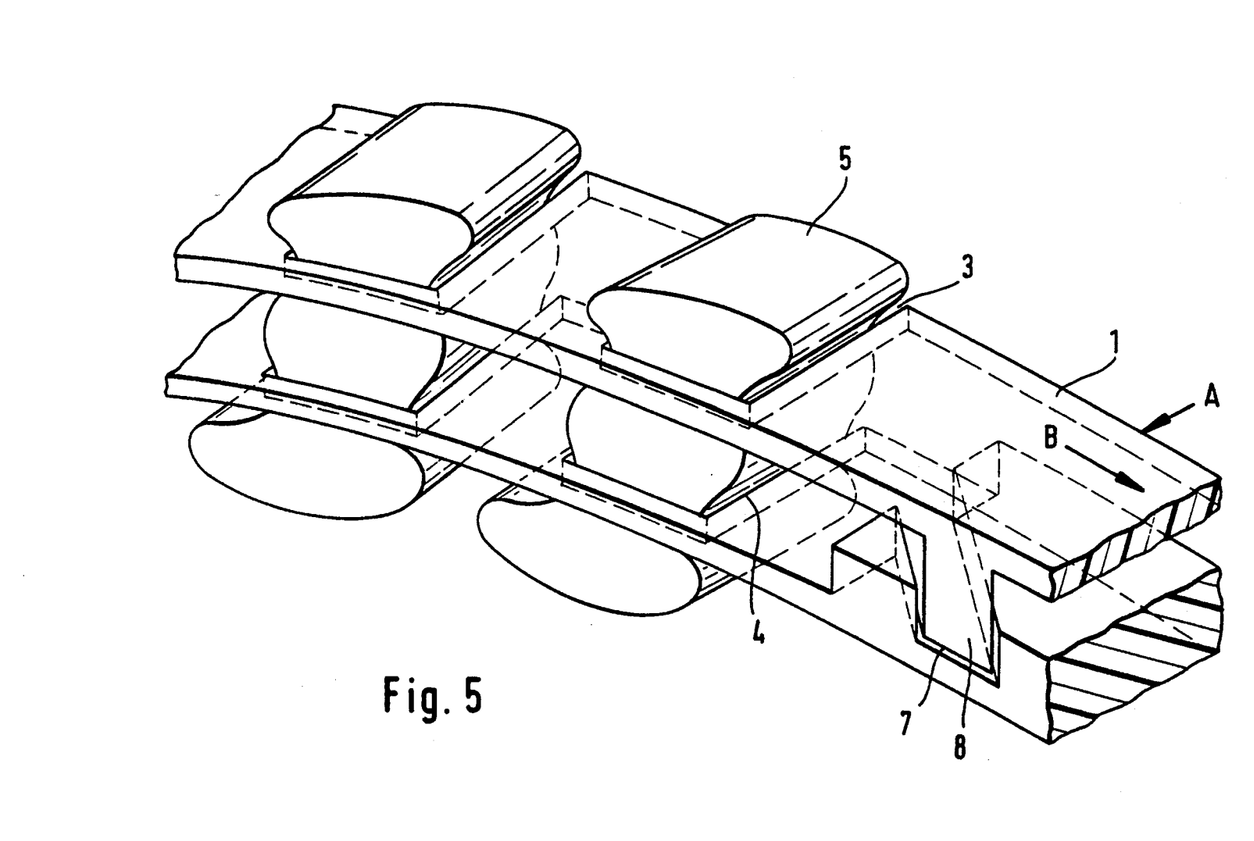

The embodiment of FIG. 2 additionally shows a switching tappet 9 on the cage ring 1 for effecting an axial displacement thereof, and an axial spring 10 acting between the two cage rings 1 and 2. The spring forms a part of the cage ring 2 and presses by its free end against the axial end face 11 of the cage ring 1. The axial displacement of the cage ring 1 by the switching tappet 9 is thus effected against the action of the spring 10. Further, the two locking elements 5 and 6 represented are inserted oppositely oriented into pockets 4 of the two cage rings 1, 2 and retained there apart from each other by a spreading spring. The opposite orientation of the locking elements 5, 6 serves for switching the freewheel in opposite directions of action. If, for example, as shown in FIG. 5, the locking elements 5, 6 are not oriented in opposite directions, the freewheel is suitable for action in one direction only.

Figure 3:
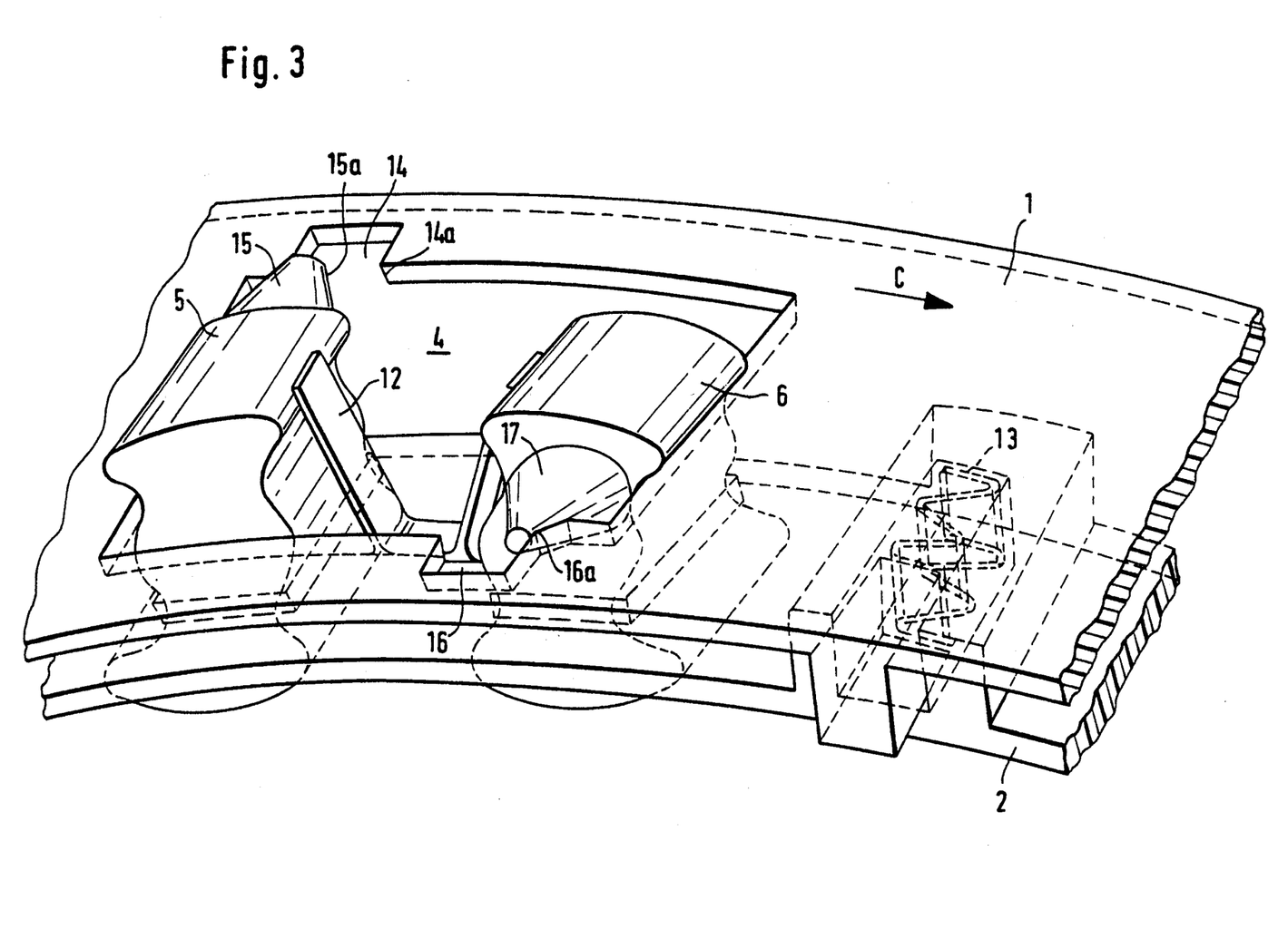

In the embodiment of FIG. 3, the spring 10 of FIG. 2 forming a part of the cage ring 2 is replaced by a spreading spring inserted between the cape rings 1 and 2. In this embodiment, the conversion of the axial movement of the cage ring 1 into a rotary movement is effected with the help of an axial cutout 14 in the cage ring 1 in conjunction with a tapered projection 15 having an inclined surface 15a provided on the end of the locking element 5 facing the cutout 14. A further similar cutout 16 is provided at the opposite end of the pocket 4 and associated with a projection 17 on the locking element 6. While the radial edge 14a of the cutout 14 cooperates with the projection 15, or more precisely, with the inclined surface 15a thereof to displace the cage ring 1 in the direction of the arrow C, the radial edge 16a of the cutout 16 cooperates with the projection 17 for displacement in the opposite direction. Analogous to FIG. 2, a spreading spring 12 is provided in this case too.

Figure 4:
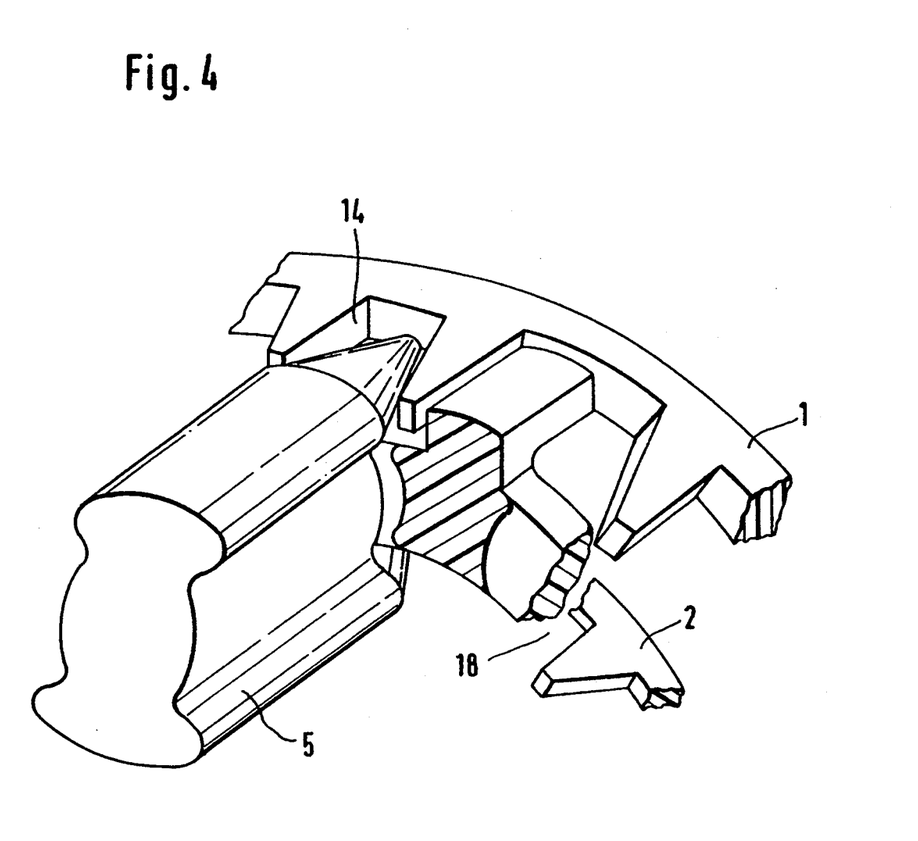

FIG. 4 shows two switching rings supported on the retaining ring (locking element guide cage) and serving to turn the locking elements in the circumferential direction. The spatially curved surfaces or bevels can be made so that a turning of the locking elements by the two switching rings is aided by the locking elements cones. Another possibility is offered by the oppositely acting inclined surfaces of the switching or locking element rings 1 and 2. In this case, the locking element can be brought into the locking position by an axial displacement for example of the locking element ring 1. The spring mounting of the locking elements or resetting springs for the locking element rings 1 and 2 required for these functions are not represented.

In the embodiment of FIG. 4, again, axial cutouts 14 are provided in the cage ring 1 while, in place of the cutouts 16 on the opposite side of the cage ring 1, in this case, cutouts 18 are provided in the cage ring 2 on the side thereof corresponding to the side of the cage ring 1 on which the cutouts 14 are provided. In this case, the cutouts 14 and 18 are not rectangular in shape as in FIG. 3, but they widen towards the pocket 4 of the cage rings 1 and 2, i.e. they are trapezium-shaped.

In the embodiments of FIGS. 1 and 2, a conversion of the axial movement of the cage ring 1 relative to the cage ring 2 into a relative rotation between the two rings is assured, whereby the locking elements 5, 6 are pivoted about their longitudinal axes and thus moved from a switched state into the freewheeling state or vice versa, the switched state implying that the locking elements 5, 6 bear against the locking surfaces, not represented, and this, in spite of small overall dimensions and basically, the simplest possible construction.

It applies quite generally, that in order to obtain the longest possible operating life and also a smaller axial switching force of the freewheel, the deflecting surfaces participating in the switching operations should be particularly wear-resistant with regard to their constituting materials; by an appropriate design of these surfaces, as for example in the embodiment of FIG. 1 comprising the groove-and-spring sliding assembly, it is also possible to insert rolling elements between the mating surfaces.

Figure 6:
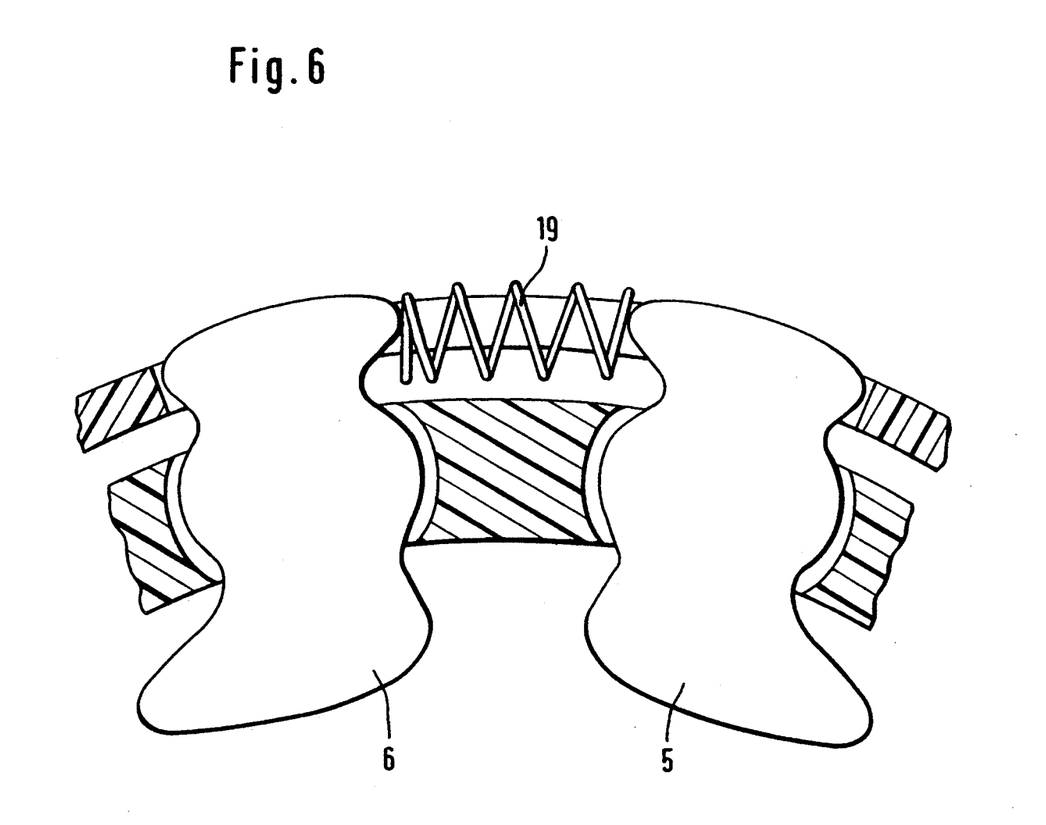

The detail represented in FIG. 6 shows the arrangement of a spreading spring 19, again directly between two adjacent locking elements 5, 6; however, in this case, the spreading spring 19 is neither a part of one of the locking rings 1, 2, nor is it supported on one of these.

Figure 7:
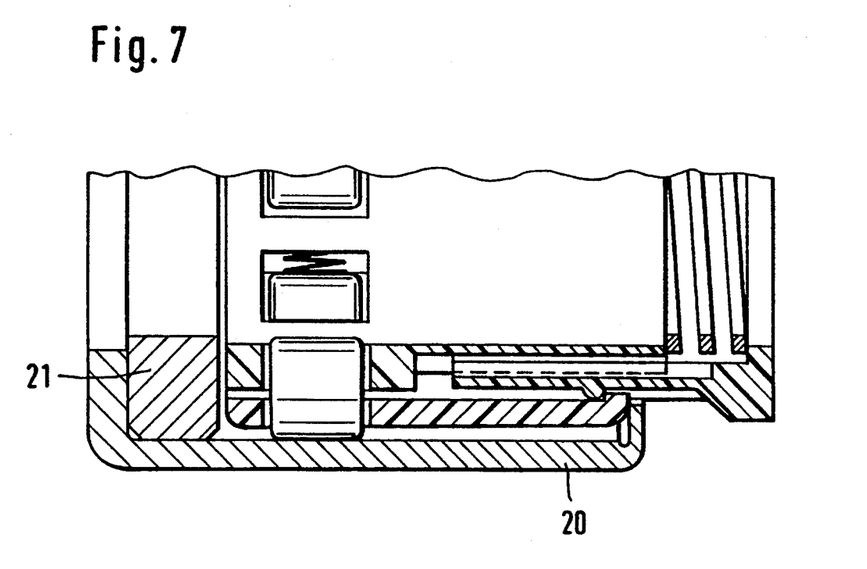
Figure 8:
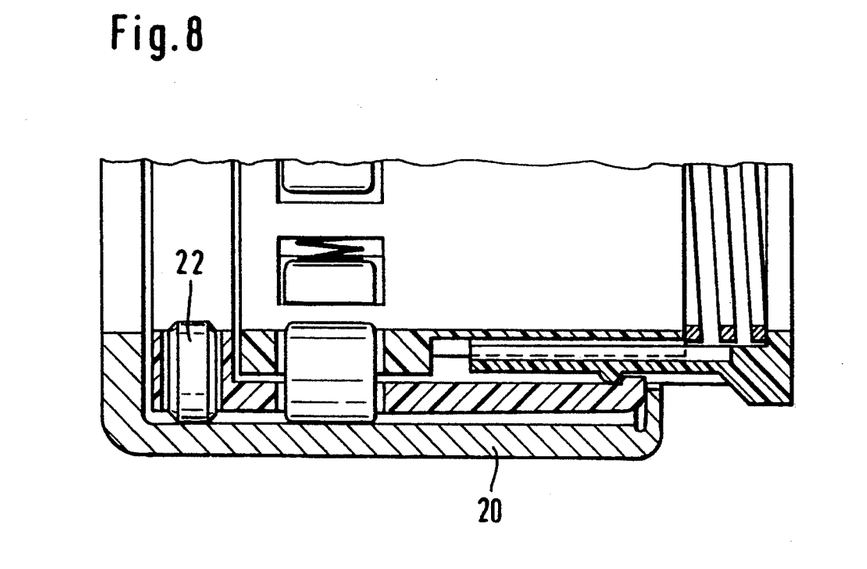

FIGS. 7 and 8 each show one half of an axial section through a freewheel which is inserted into a bush 20, wherein according to FIG. 7, a sliding bearing 21, and according to FIG. 8, a rolling bearing 22 is arranged on an end face of the freewheel properly speaking, and associated with the inner circumferential surface of the bush 20.

Figure 9:
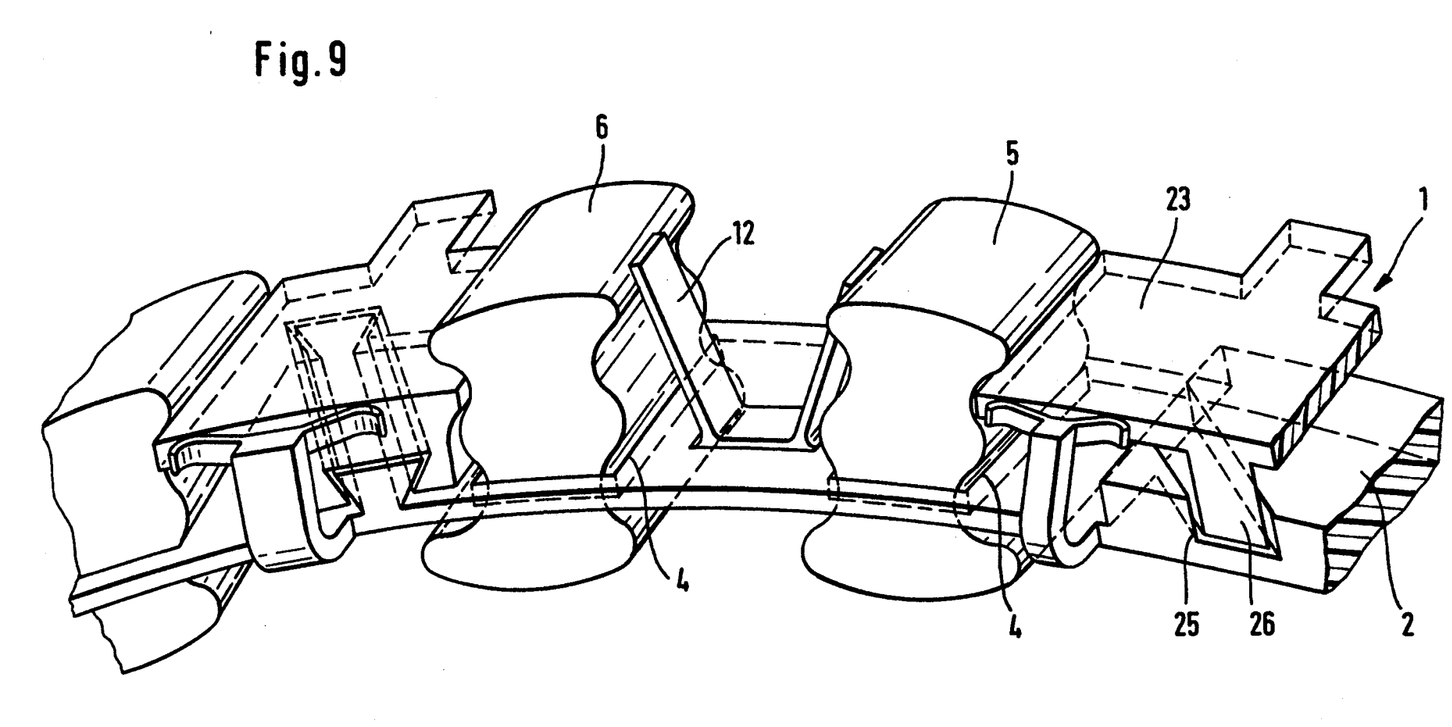

FIG. 9 shows a perspective view of a partial region of two cage rings 1, 2 wherein the cage ring 1 is constituted by segments 23 or 24. The segment 23 is a portion of the cage ring 1 of FIG. 2. The locking elements 5 and 6 of the embodiment of FIG. 9 are also the same as those of FIG. 2. Alternatively to the segment 23 which comprises a groove 25 and a spring 26, the segment 24 is designed as a dovetail guide.

We claim:

1. In a switchable locking element freewheel comprising two concentric cage rings (1,2) and locking elements (5,6) located in pockets (3,4) thereof, the locking elements (5,6) changing their locking position as a result of a relative displacement of the cage rings (1,2), the improvement which comprises at least one of the cage rings (1,2) including facility (8) which is guided along a surface (7) provided on the other cage ring (2,1) and inclined relative to a freewheel axis so that, under an axial force on one of the cage rings (1,2), they are moved relative to each other both in an axial and a circumferential direction, to cause tilting of the locking elements (5,6) for switching the freewheel.

2. The freewheel of claim 1 wherein the facility (8) is a surface slanted with respect to said freewheel axis.

3. The freewheel of claim 2, wherein the inclined surface (7) and the slanted surface of facility (8) together form a sliding assembly comprising a groove (7) on one cage ring (2) and a spring (8) on the other cage ring (1).

4. The freewheel of claim 2 wherein the inclined surface (7) and the slanted surface (8) are made as spatially curved surfaces in a complementary or frictional locking relationship and bear against each other.

5. In a switchable locking element freewheel comprising two concentric cage rings (1,2) and locking elements (5,6) located in pockets (3,4) thereof, the locking elements (5,6) changing their locking position as a result of a relative displacement of the cage rings (1,2), the improvement of which comprises at least one of the cage rings (1,2) including at least one facility (14, 14a, 16, 16a), and at least one of the locking elements (5,6) comprises a projection (15,17) at its axial end facing the facility (14, 14a, 16, 16a), which projection (15,17) is tapered in an axial direction toward said facility and comprises a surface (15a, 17a) which is inclined relative to a freewheel axis so that, on application of an axial force to one of the cage rings (1,2), the facility (14, 14a, 16, 16a) is moved along the inclined surface (15a, 17a) with a simultaneous tilting of the locking element (5,6) for switching the freewheel.

6. The freewheel of claim 5 wherein the facility is an axial cutout in one of said cage rings (1,2) and having a radial edge (14a, 16a) and facing a locking element pocket (4).

7. The freewheel of claim 5 wherein the facility (8) is a spatially curved surface of the axial cutout (14, 16).

8. The freewheel of claim 6 wherein one of the cage rings (1,2) comprises two axial cutouts (14,16) with radial edges (14a, 16a) facing a locking element pocket (4), one (16) of the axial cutouts being at one axial end of the locking element pocket (4) and the other axial cutout (14) being arranged at another axial end of the locking element pocket (4) in which two locking elements (5,6), each comprising a projection (15,17) at its axial end facing the axial cutout (14,16), are located.

9. The freewheel of claim 6 wherein there are two axial cutouts (14,18) circumferentially offset with respect to each other on different cage rings (1,2) and two tapered projections on a same axial end of the locking element (5).

10. The freewheel of claim 5 wherein a spring (10,13) between the two cage rings (1,2) acts on the cage rings (1,2) in the axial direction.

11. The freewheel of claim 10 wherein the spring (10) forms a part of the cage ring (2) and presses its free end axially against the other cage ring (1).

12. The freewheel of claim 5 wherein one of the two cage rings (1,2) comprises individual segments (23,24), each said individual segment (23,24) being between circumferential adjacent locking elements (5,6).

* * * * *